(12) United States Patent
Bonansea et al.

(10) Patent No.: US 7,982,598 B2
(45) Date of Patent: Jul. 19, 2011

(54) METHOD FOR INTEGRATING USER NOTIFICATIONS AND USER ALERTS ON AN ELECTRONIC DEVICE

(75) Inventors: Michel Bonansea, San Francisco, CA (US); William Austin Rainey, IV, Santa Clara, CA (US); Sara Berg, Mt. View, CA (US)

(73) Assignee: Access Co., Ltd., Tokyo (JP)

( * ) Notice: Subject to any disclaimer, the term of this patent is extended or adjusted under 35 U.S.C. 154(b) by 183 days.

(21) Appl. No.: 12/026,546

(22) Filed: Feb. 5, 2008

(65) Prior Publication Data

US 2008/0272907 A1 Nov. 6, 2008

Related U.S. Application Data

(60) Provisional application No. 60/888,530, filed on Feb. 6, 2007.

(51) Int. Cl.
*G08B 1/08* (2006.01)

(52) U.S. Cl. .................................. 340/539.11; 340/539.1
(58) Field of Classification Search ............. 340/539.11, 340/539.1
See application file for complete search history.

(56) References Cited

U.S. PATENT DOCUMENTS

| | | | |
|---|---|---|---|
| 6,998,978 B2 * | 2/2006 | Kirkeby | 340/539.12 |
| 7,034,691 B1 * | 4/2006 | Rapaport et al. | 340/573.1 |
| 7,436,311 B2 * | 10/2008 | Rapaport et al. | 340/573.1 |
| 2005/0242928 A1 * | 11/2005 | Kirkeby | 340/286.07 |

* cited by examiner

*Primary Examiner* — Travis R Hunnings
(74) *Attorney, Agent, or Firm* — Berry & Associates P.C.

(57) ABSTRACT

An interface for integrating and presenting user notifications and alerts consistently on an electronic device such as a mobile device is disclosed. First, an application programming interface provides the segregation to multiple preselected levels of priority notifications and alerts from all applications on the mobile device. Second, the application programming interface provides for the ability to display the notifications and alerts in a consistent manner for the user to handle.

12 Claims, 4 Drawing Sheets

METHOD FOR INTEGRATING USER NOTIFICATIONS AND USER ALERTS ON AN ELECTRONIC DEVICE

CROSS REFERENCE TO RELATED APPLICATION

This application claims the benefit under 35 U.S.C. Sec 119(e) U.S. PROVISIONAL PATENT APPLICATION No. 60/888,530, filed on Feb. 6, 2007, and entitled "Method For Integrating User Notifications and User Alerts On A Mobile Device," which is incorporated herein by reference.

FIELD OF THE INVENTION

The present invention generally relates to a method for navigating the content of an electronic device, for example, a mobile device. More specifically, the invention relates to a method for organizing, integrating, and displaying user notification and alerts regarding the device content and facilitating control of such content.

BACKGROUND OF THE INVENTION

Typically, desktop computer systems have large display screens that allow users to search for data and navigate through files via a hierarchical display arrangement such as a file directory. However, in computer systems with small display screens, including personal digital assistants (PDAs) and portable computers (hereinafter collectively termed "mobile devices") hierarchical displays may be impractical in view of the limited display space. For example, tasks such as browsing or searching for a specific item in a hierarchical display may be problematic and inconvenient when using a mobile device, as the user likely cannot view all the results without considerable scrolling and navigating.

Typically, mobile devices have a number of software applications to inform users of the state changes in a timely and dependable fashion. Some examples include notifying the user of missed telephone calls and voicemails, the status and number of electronic mail messages and short messages that have been received, and the progress of web downloads that are in progress or have been completed.

Generally, each desired software application has its own notification mechanism for the user. A notification mechanism for applications, if not handled in a consistent manner, can be confusing to the user, resulting in information residing in the mobile device that is un-interpretable or un-actionable by the user. Information that is not aggregated for presentation consistently, can cause the user to miss important notices and can cause frustration and anxiety, as well as concern that the mechanism is not reliable.

The fact that many applications require the full screen may result in the user having to navigate multiple locations for notifications and alerts. For example, some applications will notify users via the status bar, while other applications will notify users via locations to which the user must navigate, home screen, idle screen, secondary display, etc.

Therefore, a need exists for integrating user notifications and alerts from multiple applications. Additionally, there is a need to generally aggregate notifications and alerts so that the notifications and alerts are presented effectively to the user. Furthermore, a need exists to aggregate notifications and alerts so that the user can easily look for status changes in different applications, as in a single and consistent location of the mobile device. Responding to these needs and providing other advantages may be obtained by various embodiments of the present invention.

SUMMARY OF THE INVENTION

Generally, the present invention provides an application programming interface, which in turn, provides a user interface, enabling a method for integrating and presenting user notifications and alerts consistently on a mobile device. In accordance herewith, an electronic device such as a mobile or computing device is provided, comprising a processing unit, memory, coupled to the processing unit, and a display screen, also coupled to the processing unit. The application programming interface enables the segregation of priority notifications and alerts from all applications on the mobile device into multiple levels. Also, the application programming interface enables display of the notifications and alerts in a consistent manner for the user. The processing unit is adapted to organize and process data relating to notifications and alerts, and display such data in a user friendly hyphenated form.

Additional features and advantages of the invention are set forth in the description which follows, and in part will be obvious from the description, or may be learned by practice of the invention.

BRIEF DESCRIPTION OF THE DRAWINGS

The invention is further described in the detailed description that follows, with reference to the appended drawings by way of non-limiting illustrative embodiments of the invention, in which like reference numerals represent similar parts throughout the drawings. It should be understood, that the invention is not limited to the precise arrangements and instrumentalities as shown in the drawings, of which.

DETAILED DESCRIPTION OF ILLUSTRATIVE EMBODIMENTS

In the following description, for purposes of explanation and not limitation, specific details are set forth in order to provide a thorough understanding of the present invention. However, it will be apparent to one of skill in the art that the present invention may be practiced with other embodiments that depart from details herein. Detailed descriptions of well known methods and systems are omitted so as to not obscure the description of the present invention.

Figure 1:
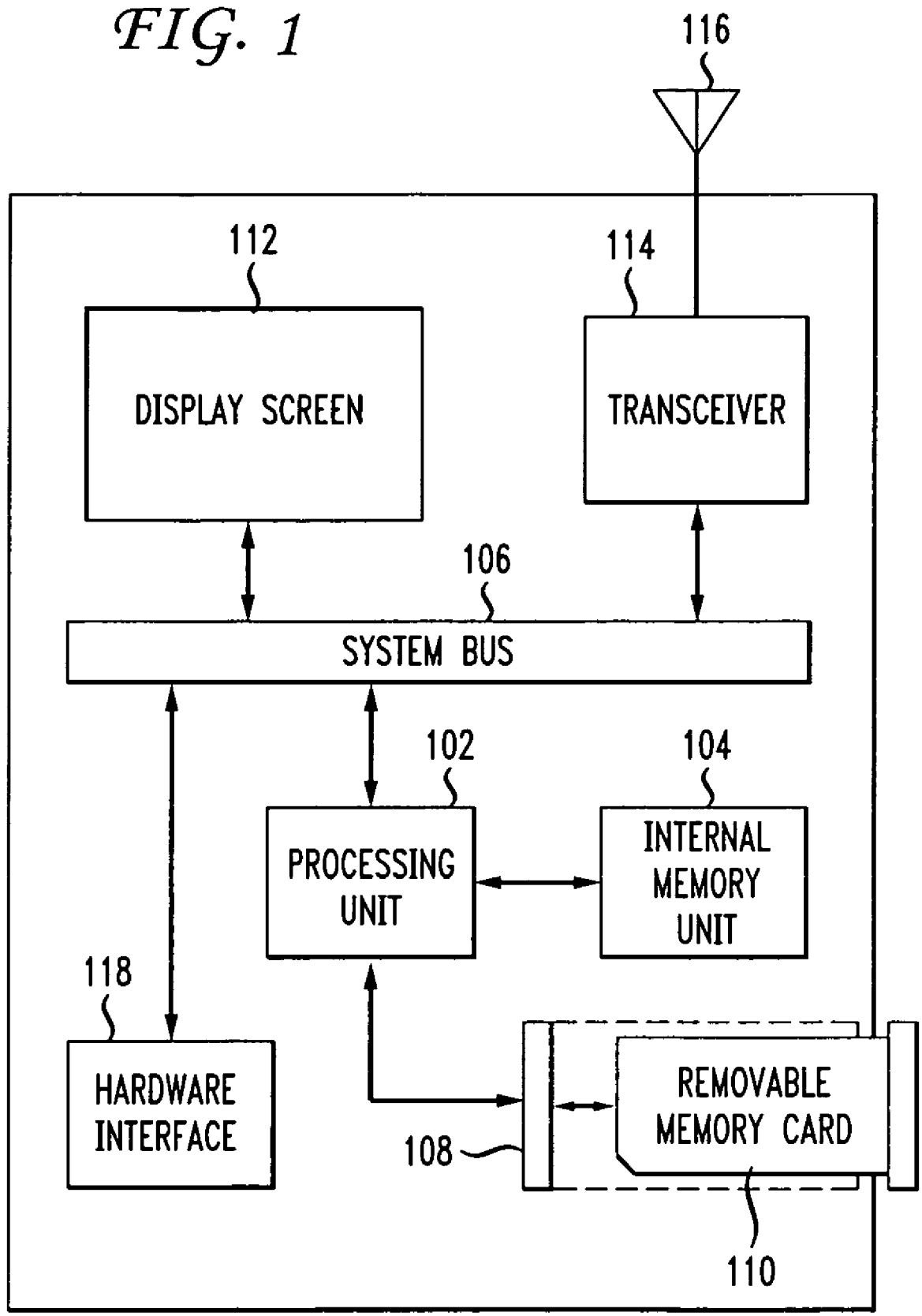
FIG. 1 is a block diagram of an exemplary electronic device such as a mobile device for utilizing the present invention.

FIG. 1 shows elements of a mobile device 100 embodied in accordance herewith for executing methods of the present invention and may comprise a portable computer, a personal digital assistant (PDA), and enhanced cell phone, or any other computer system having a relatively small display screen, and preferably having wireless communication capability. The mobile device includes a processing unit, 102, adapted to run an operating system platform and application programs. The processing unit 102 is also adapted to control other complements of the mobile device as explained herein. An internal memory unit, 104, may comprise a read-only memory (ROM) to store critical files and a random access memory (RAM) to store other files as needed. The mobile device of FIG. 1 may also include the removable memory card interface 108 as to accommodate the memory card 110.

Figure 2:
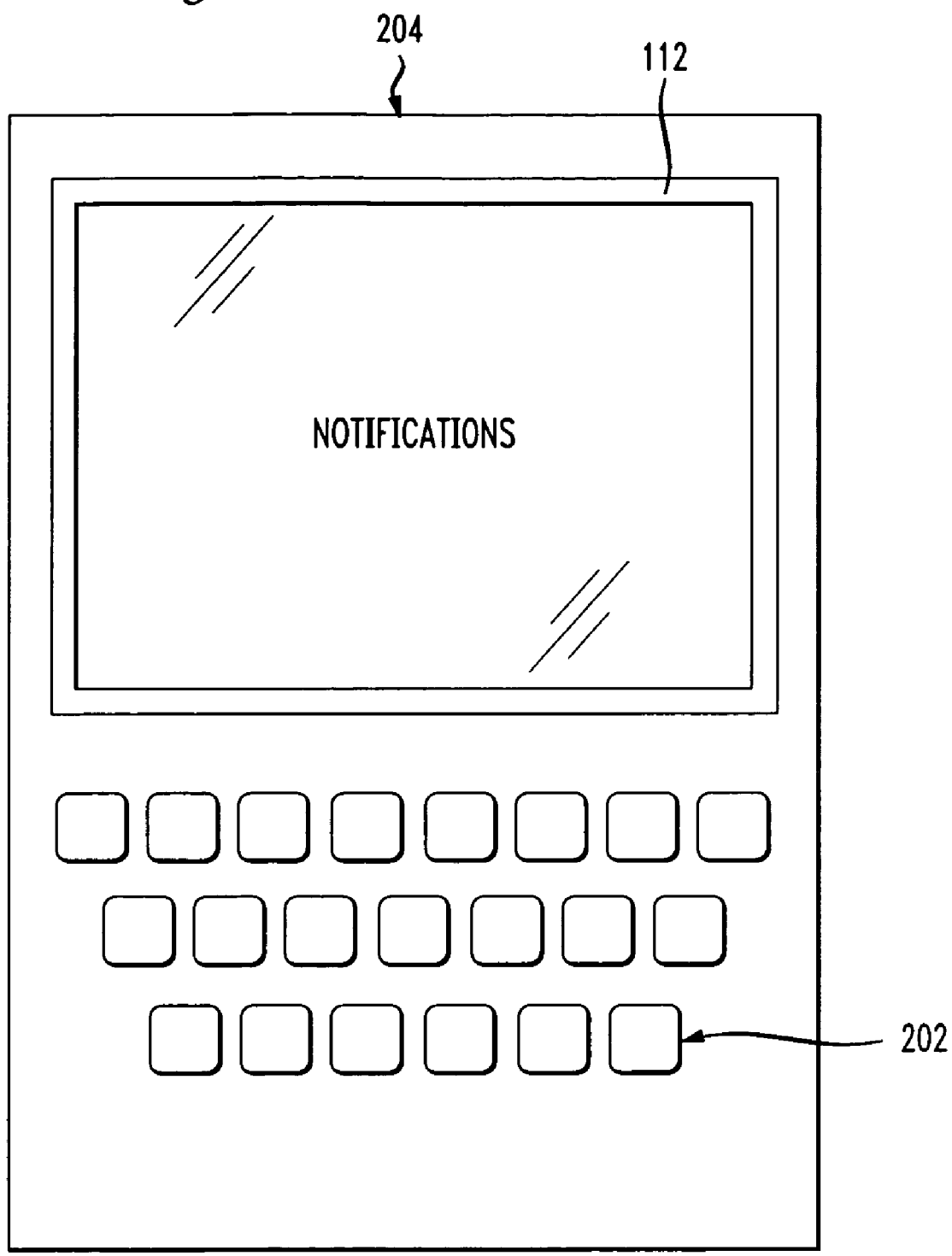
FIG. 2 is a front view of an electronic device such as a mobile device usable in accordance herewith and embodying the system in FIG. 1.

A display screen 112 is coupled to the processing unit 102 through a bus 106 and thereby receives input from the processing unit 102 that provides displays on the screen 112. The system of FIG. 1 also includes a transceiver unit 114, coupled to an antenna 116 and to the processing unit 102. The transceiver 114 provides for transmission and reception of wireless signals over a designated range of frequencies, allowing the mobile device connections external devices and networks, such as a wireless telephone network or the internet. Data received from external sources via the transceiver 114, such as media content obtained from an online depot may be delivered via the bus 106 to the processing unit 102 and thereafter stored in available memory. As depicted in FIG. 1, a hardware interface 118 is coupled to a keypad or switches on the body of the mobile device. Referring now to FIG. 2, a keypad 202 is illustrated along with the display screen 112 contained in a housing 204 to constitute a mobile device for utilization in accordance with the present invention.

In operation, the present invention enables the integration of user notifications and alerts for users that may come from multiple applications, which integration includes separating notifications and alerts based on priority. The priority levels can be set, for example to separate high, medium, and low priority notifications based on how important the notice is for the user's immediate attention. Notifications are then presented to the user in slightly different ways depending on the priority of the alert. For example, an incoming phone call could represent a high priority event in the instance that the phone was not set to a "silent" mode. In such a case, the incoming call triggers a full screen modal dialog requiring the user's interaction or pre-set permission to handle the incoming call in a specified manner (e.g., "after three rings send the incoming call to voicemail" or "send the call to voicemail immediately if the phone's ringer is turned off"). Of course, the notifications are provided to the user on the screen 112.

For a high priority notification, the operating system makes the presentation to the user, and if the call is missed, the system presents a missed call notification in a list of aggregated notices available through a general mechanism on the device's status bar. The invention permits this notification also to be shown to the user, as on a home screen, along with the notifications list.

Figure 3:
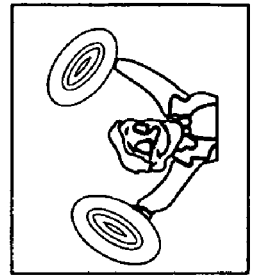
FIG. 3 is a series of front views depicting exemplary notifications provided on the device of FIG. 2, in accordance with the present convention.
Figure 3:

Generally, the screen 112 displays notifications as treated in detail below. Specifically, referring to FIG. 3 by way of example, three different pre-selected levels of priority notifications are illustrated. The first illustrative example 310 is a pre-selected high priority notification that is modal and must be handled by the user. The second exemplary display 312 is a pre-selected medium priority notification that can be temporarily dismissed and will return if the user selects the snooze option. The third exemplary display 314 is a list of notifications accessed from the status bar. Each notification in the list can be selected and activated to navigate according to the details of the notification in the originating application.

In one particular embodiment, four levels of notifications are specified: the first level displays a modal full form dialog which requires the user's interaction in order to be dismissed. The second level presents a non-modal information dialog for the user's interaction that will automatically dismiss if not attended to within a specified period of time. The third and lowest level simply adds the notification to a list of current notices. The list can be reviewed and managed at any time, and list entries permit navigation to the originating application as well as access to detailed information relevant to each reported event. The fourth level is a sound-only alert that has no visible representation on the display screen 112.

The invention includes an Application Programming Interface ("API") library for use by third party applications. Such an API is a set of routines that an application uses to request and carry out lower-level services performed by the mobile device's operating system. The invention additionally includes components for background processes and user interface applications. These components allow for the posting, updating and deletion of alert messages and dialogs, and then the controlled presentation of the alerts. The way in which the alerts are presented is designed to minimize the intrusion upon the user's activities and the attention the user must give in dealing with them.

Figure 4:
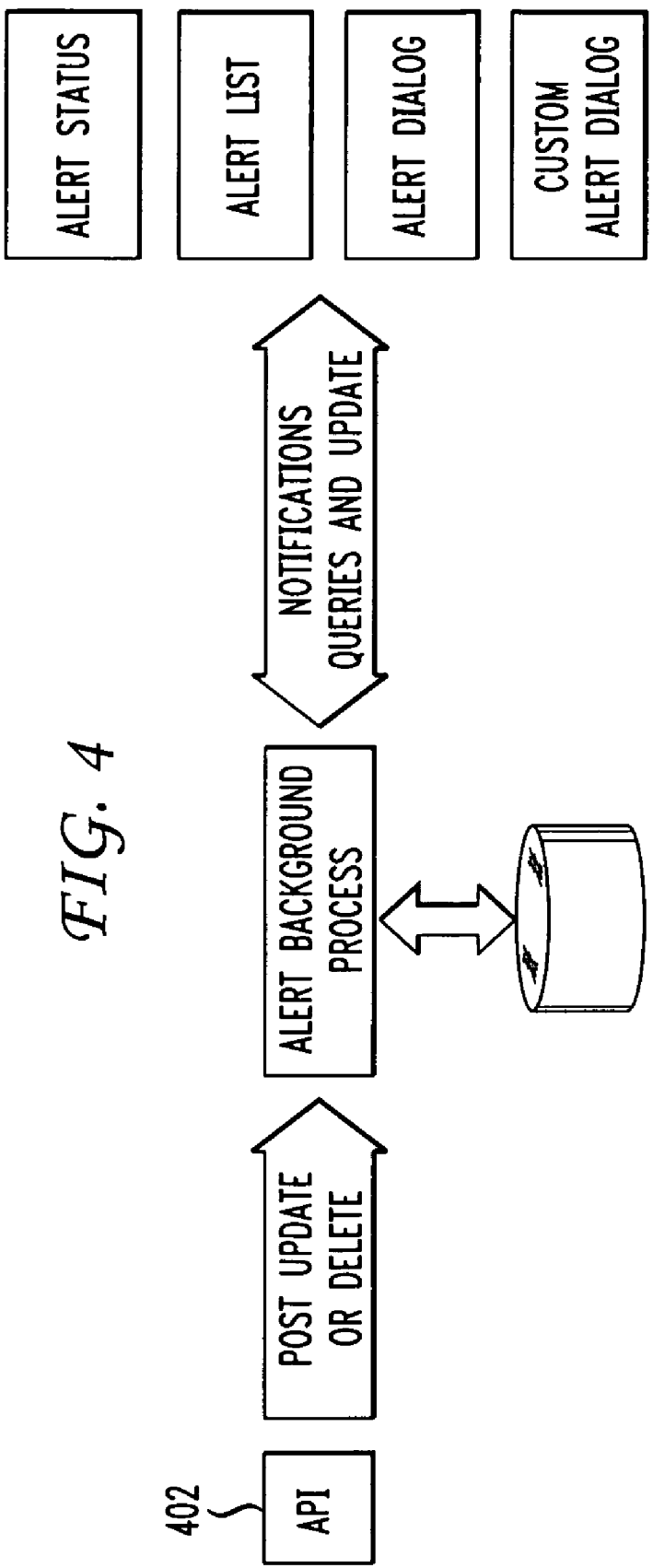
FIG. 4 is a diagram of the process embodied in the system of FIG. 1 in accordance with the present invention.

Referring now to FIG. 4, there is shown a diagram of the general structure of the implementation of the invention. In one embodiment, there is presented a notifying graphic for all notification types, regardless of priority. It will be apparent to those skilled in the art that other methods of notifying the user particularly for each level of priority is contemplated. The current implementation presents one notifier graphic for all notification types. However, the invention is flexible and can accommodate cycling or other rule-based presentations of the notification-specific icons, and can employ different presentation techniques for different presentation targets (e.g., the device's main display, secondary display, or subplastic lighting displays).

The Application Programming Interface ("API") provides an interface to other applications and programs on the mobile device to post, update or delete an alert. The API 402 connects to the background process portion of a running application to store, update or delete the alerts given in API calls. The background process also will cause the user interface applications to reflect the state/display of the alerts as appropriate.

In one exemplary embodiment, the API calls three user interface applications for displaying the notifications and alerts to the user. The first user interface application is a simple indicator presented on the display device 112 or device indicators (such as an LED or through a sound or vibration) to get the user's attention that alerts are present. The second user interface application presents a subset of alerts on the display device 112 in the form of a list with graphics to help differentiate one alert type from another. The third and most directly intrusive of these applications is the display by the display device 112 of individual alerts to the user, in some cases not relinquishing the display until the user acknowledges the alert while in other, presenting the alert for a short time period before the alert dismisses itself from the display. Depending on the alert, there is potential to use other signaling methods to get the user's attention such as sounding a bell or turning on and off the device's vibrator.

It will be understood that the API is flexible and allows for a wide range of information to be displayed with each alert. This flexibility is achieved by allowing an arbitrary list of properties and associated values to be specified for the alert when it is either posted or updated. These properties, when used in conjunction with a user interface description (also specifiable through a property), control how the alert is presented as well as what and how information is displayed for each alert. This includes, for example, (a) which image(s) to display with the alert, (b) what sound to play, (c) what on/off pattern to use in activating the device's vibrator, (d) what colors and patterns to use when blinking the LED, or (e) what to display on a secondary display device in addition to what is displayed on the primary display device.

The background process will receive posts and updates for alerts and then store them until deleted as a result of client application requests or actions defined in the alert's properties in response to events that occur in the lifetime of the alert. Such events could be when the alert is acknowledged by the user or another alert replaces the current one on the display or the device goes into its sleep mode. Actions that might be taken to such events could be to delete the alert, cause the alert to snooze (the presentation of the alert is removed and an alarm is scheduled for when to represent the alert), or simply dismiss it from the screen but still have it visible on the alert list. The purpose of storing the alerts is to allow the persistence of the alert should the device be turned off or restarted. Another responsibility of this background process is to determine when the other user interface applications need to be started.

In another embodiment, there are two auxiliary files that may be used to further enhance and alter the behavior of this system so that it is easy to use and easy to customize for different user populations. The first is an alert template file which is used to specify the properties that do not change for each instance of an alert of the same alert type (for e.g., alert types such as "calendar alarms" or "missed call alerts"). This simplifies the information that must be provided in the API call to post each alert by only requiring a subset of properties to be provided. The second auxiliary file allows the specification of rules and associated actions to be taken for each alert type. These are used to allow the customization of the manner in which alerts are presented.

The disclosed invention may include modifications to extend the system of user alerts and notifications. For instance, the notification mechanism can handle multiple types of user alerts and notifications. In another example, notifications can also be polled and pulled from remote servers to inform users of the availability of content or other items presenting revenue opportunities to licensees on a subscription or "push" basis. Additional uses for this mechanism include recognition of location-sensitive software applications; e.g., "you are now physically close to the following registered friends" or "smart" updates of software and content. Priorities and reprioritizing of notifications is flexible as well, as adding new levels of priorities up to numerous distinct levels.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method for integrating and presenting user notifications and alerts on an electronic device, the method comprising the steps of:

originating one or more user notifications and alerts from a plurality of applications operating on an electronic device;

integrating the one or more user notifications by separating the one or more user notifications and alerts into categories based on pre-selected priority;

presenting the one or more user notifications and alerts based on pre-selected priority; and storing the one or more user notifications and alerts based on pre-selected levels of priority.

2. The method of claim 1, wherein the pre-selected priority comprises high, medium, and low priority levels.

3. The method of claim 1, wherein the one or more user notifications and alerts are presented to the user on a display screen of the electronic device.

4. The method of claim 1, further comprising the step of specifying a property that does not change for each instance of a user notification and alert of the same alert type.

5. The method of claim 1, further comprising the step of specifying rules and associated actions to be taken for each alert type.

6. The method of claim 1, further comprising the step of receiving one or more user notifications and alerts from remote servers.

7. The method of claim 1, further comprising the step of originating a user notification or alert based on the location of the electronic device.

8. A system for integrating and presenting user notifications and alerts on an electronic device:

an electronic device comprising:

a display screen;

a processing unit coupled to the display screen;

a memory coupled to the processing unit;

a plurality of applications executing on the processing unit that originate one or more user notifications and alerts; wherein a first software routine stored in the memory having instructions that when executed on the processing unit integrates one or more user notifications and alerts by separating the one or more user notifications and alerts into categories based on pre-selected priority;

a second software routine stored in the memory having instructions that when executed on the processing unit present the one or more user notifications and alerts based on pre-selected priority; and a third software routine stored in the memory having instructions that when executed on the processing unit store the one or more user notifications and alerts in the memory based on pre-selected levels of priority.

9. The system claim 8, wherein the pre-selected priority comprises high, medium, and low priority levels.

10. The system of claim 8, wherein the user notifications and alerts are presented to the user on the display screen of the electronic device.

11. The system of claim 8, further comprising a fourth software routine stored in the memory having instructions that when executed on the processing unit specify a property that does not change for each instance of a user notification and alert of the same alert type.

12. The system of claim 8, further comprising a fifth software routine stored in the memory having instructions that when executed on the processing unit specify rules and associated actions to be taken for each alert type.

* * * * *